(12) United States Patent
Brenes et al.

(10) Patent No.: US 7,445,019 B2
(45) Date of Patent: Nov. 4, 2008

(54) GATE VALVE HAVING SERVICE POSITION

(75) Inventors: Arthur J. Brenes, Castro Valley, CA (US); Yoshi Takayama, Reno, NV (US); John Duncan, Reno, NV (US)

(73) Assignee: High Vacuum Apparatus Mfg., Inc., Reno, NV (US)

( * ) Notice: Subject to any disclaimer, the term of this patent is extended or adjusted under 35 U.S.C. 154(b) by 6 days.

(21) Appl. No.: 11/749,117

(22) Filed: May 15, 2007

(65) Prior Publication Data
US 2008/0035876 A1 Feb. 14, 2008

Related U.S. Application Data

(60) Provisional application No. 60/800,723, filed on May 15, 2006.

(51) Int. Cl.
*F16K 31/122* (2006.01)
(52) U.S. Cl. .................... 137/315.29; 251/62; 251/187; 251/193; 251/329
(58) Field of Classification Search ................. 251/62, 251/175, 187, 193, 329; 137/15.23, 315.29
See application file for complete search history.

(56) References Cited

U.S. PATENT DOCUMENTS

| | | | |
|---|---|---|---|
| 4,568,058 A * | 2/1986 | Shelton | 251/62 |
| 4,765,361 A * | 8/1988 | Clifford | 251/193 |
| 5,597,184 A | 1/1997 | Brenes et al. | |
| 5,791,632 A | 8/1998 | Brenes | |
| 5,881,998 A | 3/1999 | Brenes | |
| 5,884,899 A | 3/1999 | Brenes | |
| 5,975,492 A | 11/1999 | Brenes | |
| 6,293,306 B1 | 9/2001 | Brenes | |
| 6,299,133 B2 * | 10/2001 | Waragai et al. | 251/193 |
| 6,443,426 B1 | 9/2002 | Brenes | |
| RE38,318 E | 11/2003 | Brenes | |
| 6,896,239 B1 | 5/2005 | Brenes | |
| 7,270,311 B1 | 9/2007 | Brenes | |
| 2005/0045846 A1 * | 3/2005 | Iwabuchi | 251/193 |
| 2005/0199848 A1 * | 9/2005 | Seitz | 251/193 |
| 2006/0124886 A1 | 6/2006 | Brenes | |
| 2008/0011974 A1 | 1/2008 | Brenes | |

* cited by examiner

*Primary Examiner*—John Bastianelli
(74) *Attorney, Agent, or Firm*—Morgan, Lewis & Bockius LLP

(57) ABSTRACT

A gate valve including a valve housing defining a valve chamber having an opening therethrough along a flow path, a gate support supported within the valve housing between a closed position in the flow path, an open position outside of the flow path, and a service position extending out of the valve housing, and a dual actuator assembly having a service piston assembly having a service piston reciprocable within the valve housing, and an inner piston assembly having an inner piston reciprocable within the service piston assembly. The gate support is configured to reciprocate with the inner piston between the closed and open positions, and with the service piston between the closed and the service positions. A method of using the gate valve is also disclosed.

19 Claims, 8 Drawing Sheets

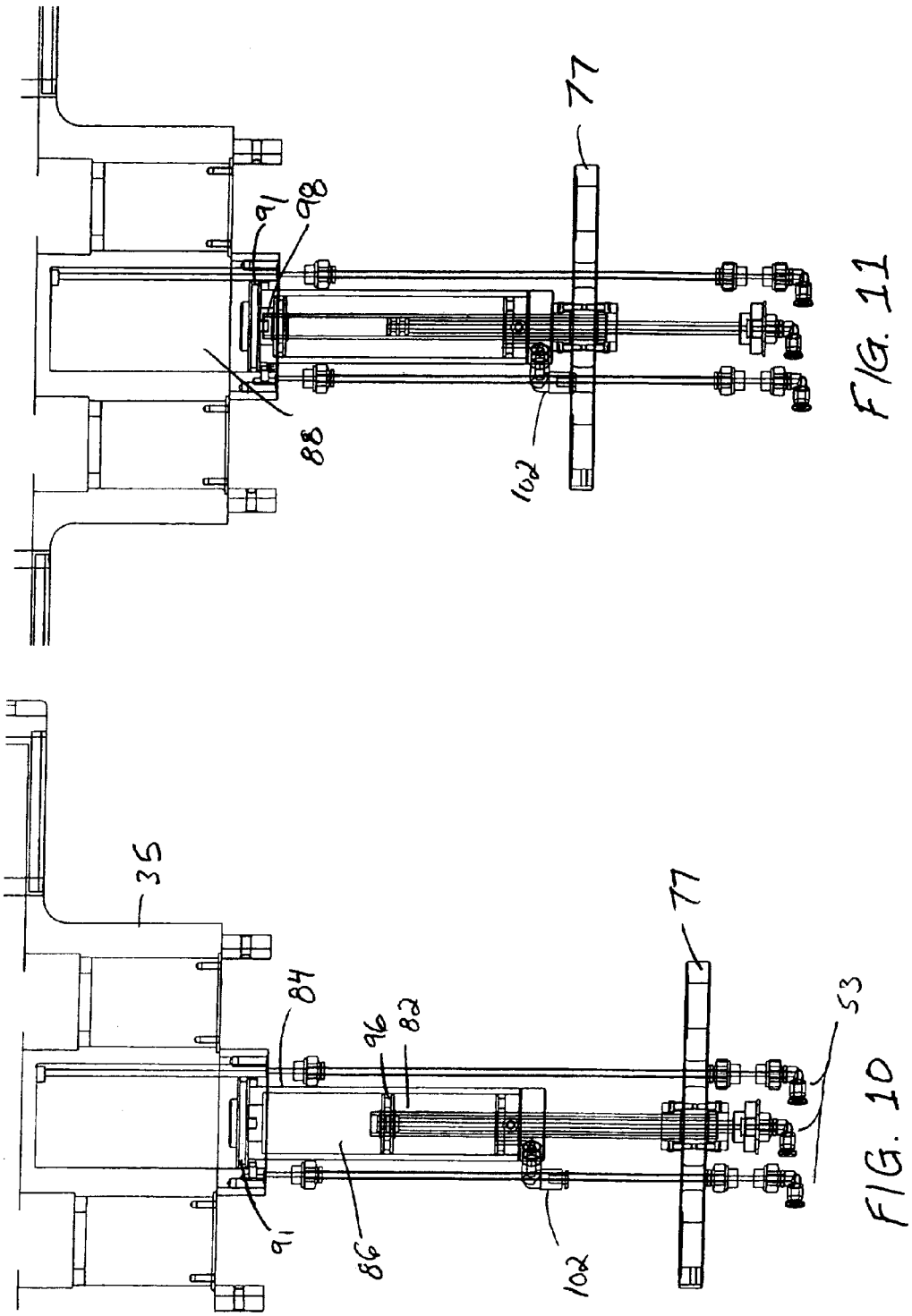

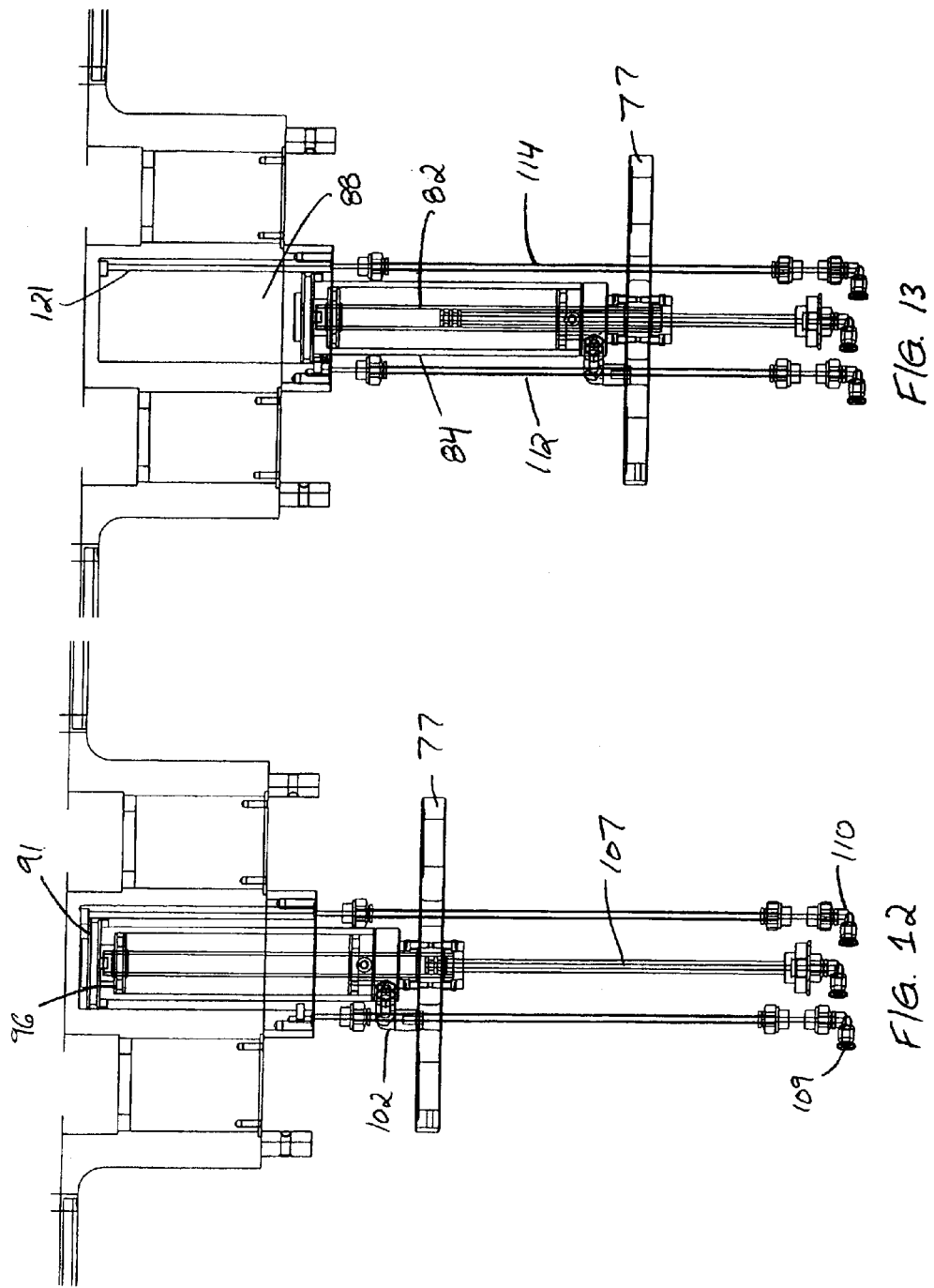

GATE VALVE HAVING SERVICE POSITION

CROSS-REFERENCE TO RELATED APPLICATIONS

This application claims priority under 35 U.S.C. § 119(e) to U.S. Provisional Patent Application No. 60/800,723 filed May 15, 2006, which is incorporated herein by reference in its entirety for all purposes.

TECHNICAL FIELD OF THE INVENTION

This invention relates, in general, to gate valves or slot valves and more particularly to gate valves having a service position and methods for their use.

BACKGROUND OF THE INVENTION

In the semiconductor manufacturing industry, automated substrate handling systems or cluster platforms move semiconductor units or wafers through a series of process modules. As the wafer moves through the cluster platform, each module performs a particular process on the wafer. Such operations include vapor deposition, etching, and similar processes.

In the industry, minimization of contaminants in the fabrication process is of utmost importance. In order to prevent defects from particulate contaminants, the cluster assembly maintains a vacuumed, "clean" room environment throughout the assembly. Modern process modules and cluster assemblies are likewise designed to minimize particulate generation through millions of cycles of operation. Typical components are designed with minimal moving parts and isolation of moving components to limit generation of particulate matter.

Modern cluster assemblies provide gate valves between process modules. The gate valves serve to allow the process modules to be vacuum sealed and also to control the flow of air or fluid within the cluster assembly. In operation, the gate valves open to allow wafers to be transferred from one process module to another. The gate valves then close to seal off the module to create a sealed, positive-pressure environment during processing.

Present gate valve assemblies must withstand millions of cycles of operation. Similar to the process modules, present gate valves have been designed to limit the generation and introduction of contaminants within the cluster assembly. An exemplar of the prior art is U.S. Pat. No. RE38,318 to Brenes which shows a low profile gate valve with bellows and is incorporated herein by reference.

Modern fabrication plants and cluster assemblies typically run at high capacity and high volume. Thus, although the assemblies and associated components involve many parts moving through millions of cycles, users demand minimal downtime for service and repairs. In the industry, even one hour of downtime to replace worn parts or lubricate components can be costly.

Given the high cost of "clean" room environments, cluster assemblies are further designed to utilize minimal space. Gate valves are therefore situated within tight spaces between process modules. The tight spacing makes present gate valves difficult to reach and routine maintenance and repair even more challenging.

Gate valves, in particular, require periodic servicing of the gate support and valving assembly. Access to present gate valves for service requires disassembly of the gate valve housing and/or portions of the surrounding modules. Given the limited space between modules, the whole gate valve often must be removed from the fabrication line in order to access the inner valve assembly. The repair and service process thus becomes tedious, time-consuming, and expensive.

What is needed is a gate valve which overcomes the above and other disadvantages. What is needed is a gate valve that allows quick access to the gate support and valve components for service.

BRIEF SUMMARY OF THE INVENTION

In summary, one aspect of the present invention is directed to a gate valve including a valve housing defining a valve chamber having an opening therethrough along a flow path, a gate support supported within the valve housing between a closed position in the flow path, an open position outside of the flow path, and a service position extending out of the valve housing. The gate valve further includes a dual actuator assembly having a service piston assembly having a service piston reciprocable within the valve housing, and an inner piston assembly having an inner piston reciprocable within the service piston assembly. The gate support is configured to reciprocate with the inner piston between the closed and open positions, and with the service piston between the closed and the service positions.

In one embodiment, the service piston assembly is a double-acting piston assembly. The inner piston assembly may also be a double-acting piston assembly. In another embodiment, the service piston assembly includes a service piston chamber formed in the valve housing having upper and lower ends. The service piston is adjacent to the upper end of the service chamber when the gate support is in the service position, and the service piston is adjacent to the lower end of the gate support during normal operation between the closed and open positions.

In one embodiment, the service piston abuts the upper end of the service chamber when the gate support is in the service position, and the service piston abuts the lower end of the service chamber during normal operation. The service piston assembly may include a service piston body. The service piston body is hollow and forms an inner piston chamber in which the inner piston reciprocates. In another embodiment, the inner piston abuts against an upper end of the inner piston chamber when the gate support is in the closed position.

In one embodiment, the inner piston assembly is concentric with the service piston assembly. The inner piston reciprocates independently relative to the service piston during operation of the gate valve.

In one embodiment, the gate valve further includes a first actuator controlling the inner piston assembly to move the gate support between the closed and open positions, a second actuator controlling the service piston assembly to move the gate support between the closed and service positions, a transversely reciprocable valve gate carried on the gate support between an sealed position abutting against the opening and a retracted position, and a third actuator controlling the valve gate between the sealed and retracted positions.

The first actuator biases the inner piston against the upper end of the inner piston chamber as the second actuator moves the service piston and the gate support between the closed and service positions. The second actuator biases the service piston against a lower end of the service piston chamber as the first actuator moves the inner piston and the gate support between the closed and open positions.

In one embodiment, the gate valve further including a piston stop in a lower end of the housing configured to limit the downward movement of the service piston.

In one embodiment, the service piston body includes an inner piston chamber plug and a fitting on the inner piston chamber plug, the fitting being configured to move with the service piston body.

A driving bar is affixed to a lower end of the inner piston rod, and a drive shaft interconnects the driving bar to the gate support. The driving bar and the drive shaft operably connects the inner piston assembly to the gate support. The driving bar laterally extends from the lower end of the inner piston rod to the drive shaft.

The third actuator is pneumatic, the gate valve further including a gate piston on the gate support for moving the valve gate, and an extendable air line housed within the driving shaft operably connecting the third actuator to the gate piston. In another embodiment, the first actuator is pneumatic, and the gate valve further includes an extendable air line within the inner piston rod operably connecting the first actuator to the inner piston chamber.

In one embodiment, the method of servicing a gate valve in a process chamber includes the steps of providing a gate support reciprocable within a housing of the valve, moving the gate support from an open position out of a flow path to a closed position in the flow path, removing a top cover of the housing, and extending the gate support from the closed position to a service position, whereby the service position is remote from the open position and substantially outside of the valve housing.

A first actuator operably connected to the gate support moves the gate support between closed and open positions, and a second actuator operably connected to the gate support moves the gate support between the closed position and the service position.

In one embodiment, the valve includes a central chamber forming a service piston chamber reciprocally mounting a service piston having a service piston body extending outward from the service piston chamber. The service piston body is configured to act as an inner piston chamber.

The step of servicing the valve is performed by applying upward pressure to the service piston and inner piston. The step of closing the valve is performed by applying pressure to bias the service piston downward to an operating position and applying pressure within the inner piston chamber to move the inner piston upward.

The gate valve of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 10 is an enlarged schematic view of the gate valve of FIG. 1 illustrating the dual actuator assembly in an open position.

FIG. 11 is an enlarged schematic view of the gate valve of FIG. 1 illustrating the dual actuator assembly shown in a closed position.

FIG. 12 is an enlarged schematic view of the gate valve of FIG. 1 illustrating the dual actuator assembly shown in a service position.

FIG. 13 is an enlarged schematic view of the gate valve of FIG. 1 illustrating the dual actuator assembly shown in a closed position.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 3:
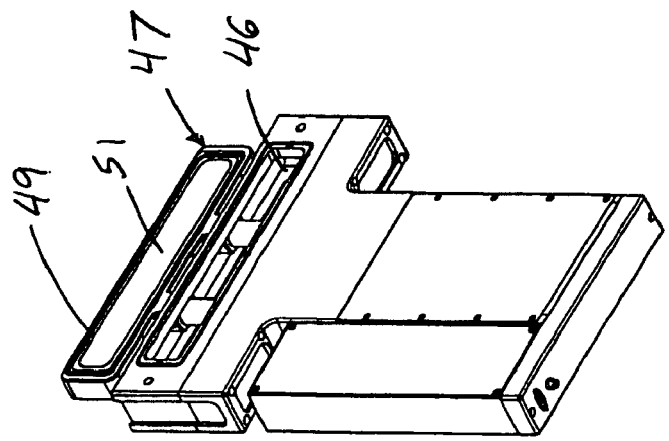
FIG. 3 is an isometric view of the gate valve of FIG. 1, the gate support shown in a service position.
Figure 2:
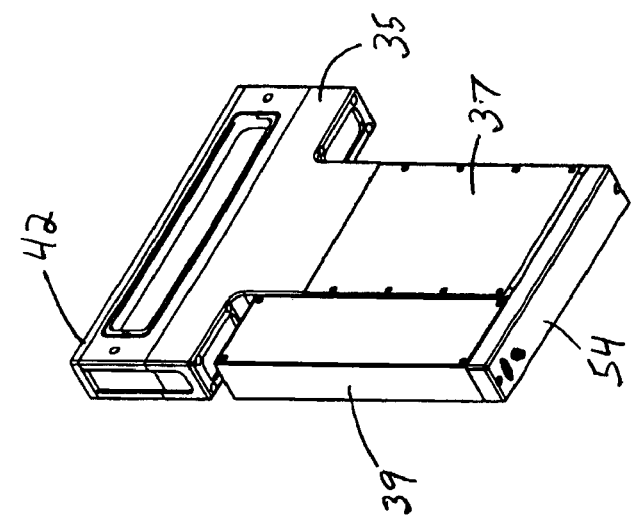
FIG. 2 is an isometric view of the gate valve of FIG. 1, the gate support shown in a closed position.
Figure 1:
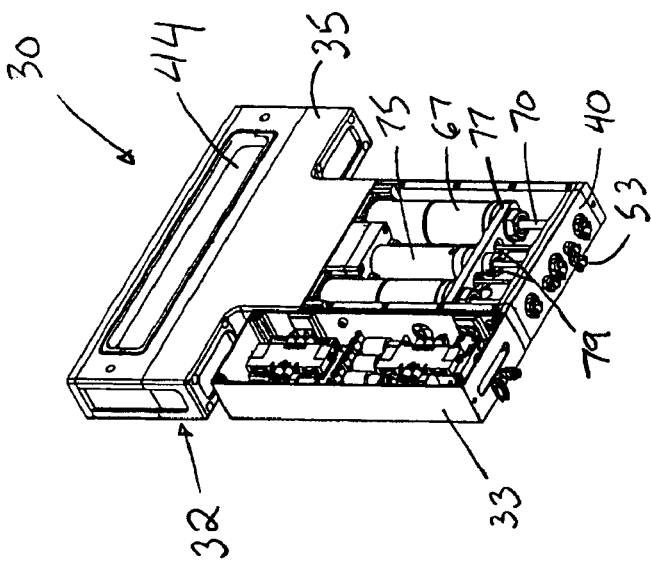
FIG. 1 is an isometric view of a gate valve in accordance with the present invention, the gate valve shown with a front plates removed.
Figure 4:
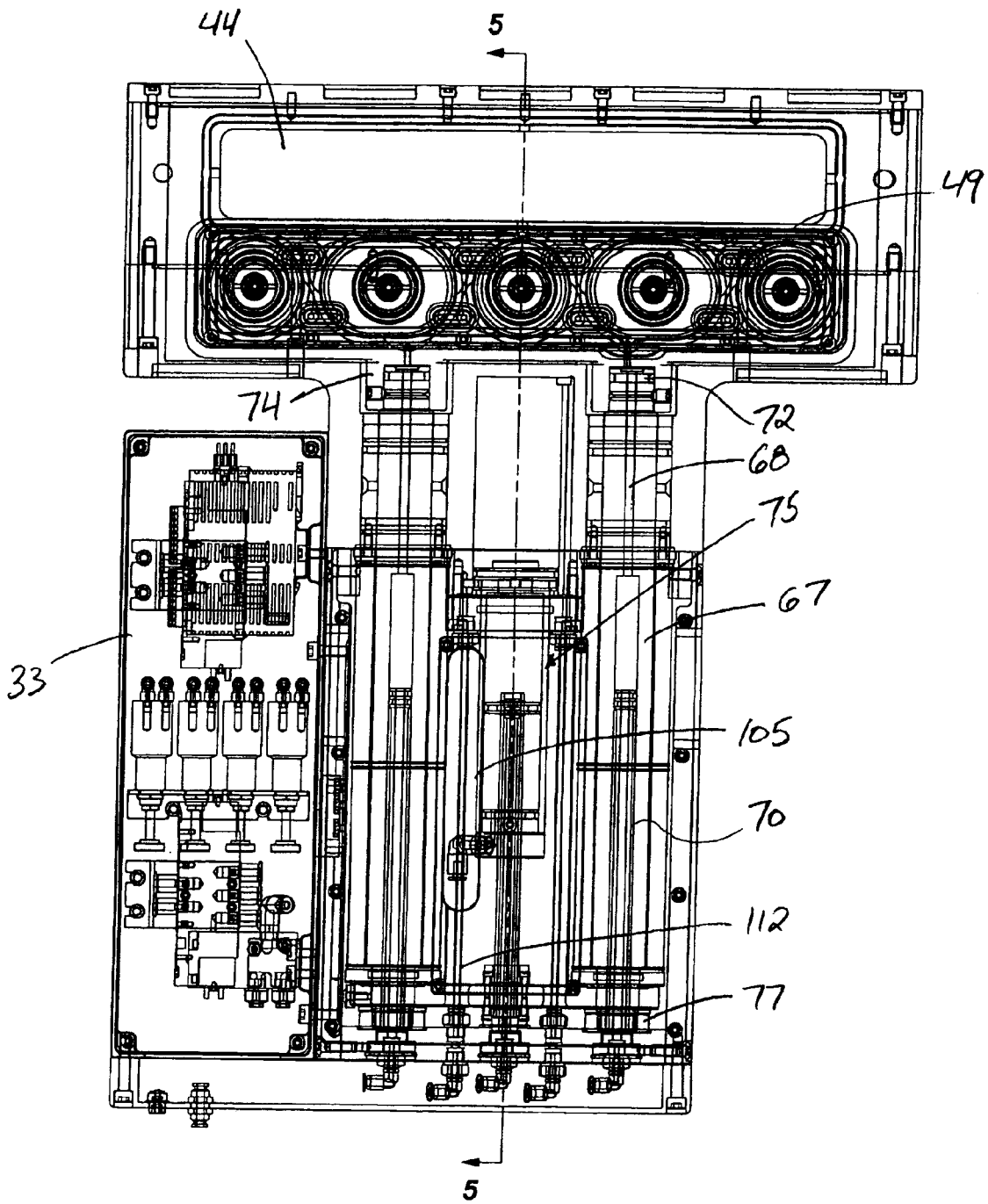
FIG. 4 is a front schematic view of the gate valve of FIG. 1, the gate support shown in an open position.

Turning now to the drawings, wherein like components are designated by like reference numerals throughout the various figures, attention is directed to FIGS. 1-3 which show an isometric view of a gate valve 30 in three positions. In some aspects, components of the gate valve of the present invention are similar to those of the valve described in U.S. Pat. No. 5,881,998 and U.S. patent application Ser. No. 11/178,227, filed Jul. 7, 2005, both to Brenes, the entire contents of which are incorporated herein by this reference. The gate valve of the present invention is directed to use with cluster platforms for semiconductor manufacturing and the like. An example of such a cluster platform is the Marathon Series cluster platform manufactured by Brooks Automation of Lowell, Mass.

Generally, gate valve 30 of the present invention includes a housing 32 and control module 33. The valve housing is preferably formed of metals including, but not limited to, aluminum and stainless steel. The housing 32 includes a main enclosure 35, front side 37, rear side (not shown), lateral sides 39, and bottom side 40.

Figures 5, 7, 9:
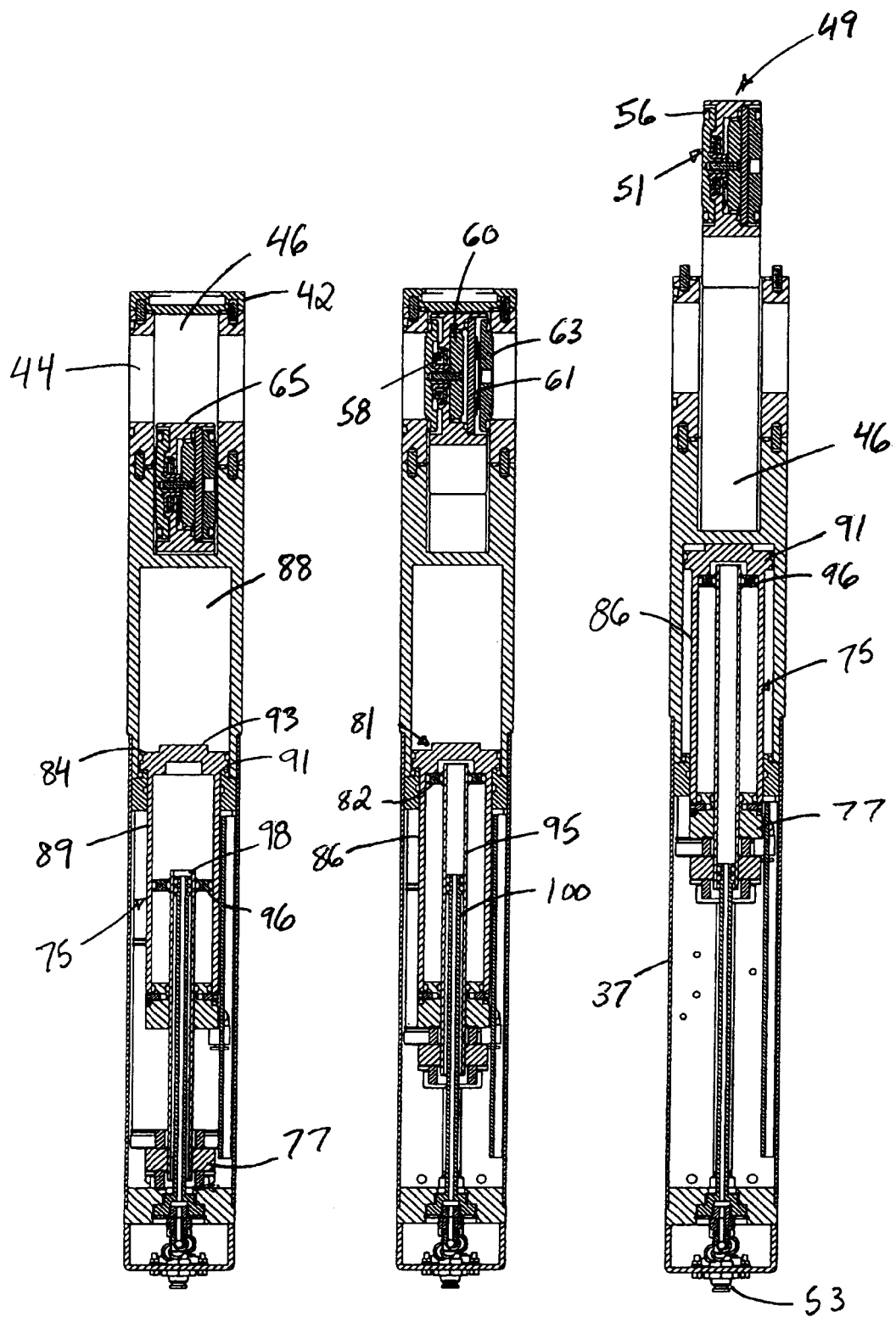
FIG. 5 is a cross-sectional view of the gate valve of FIG. 4, taken along the line 5-5 of FIG. 4.
FIG. 7 is a cross-sectional view of the gate valve of FIG. 6, taken along the line 7-7 of FIG. 6.
FIG. 9 is a cross-sectional view of the gate valve of FIG. 8, taken along the line 9-9 of FIG. 8.
Figure 6:
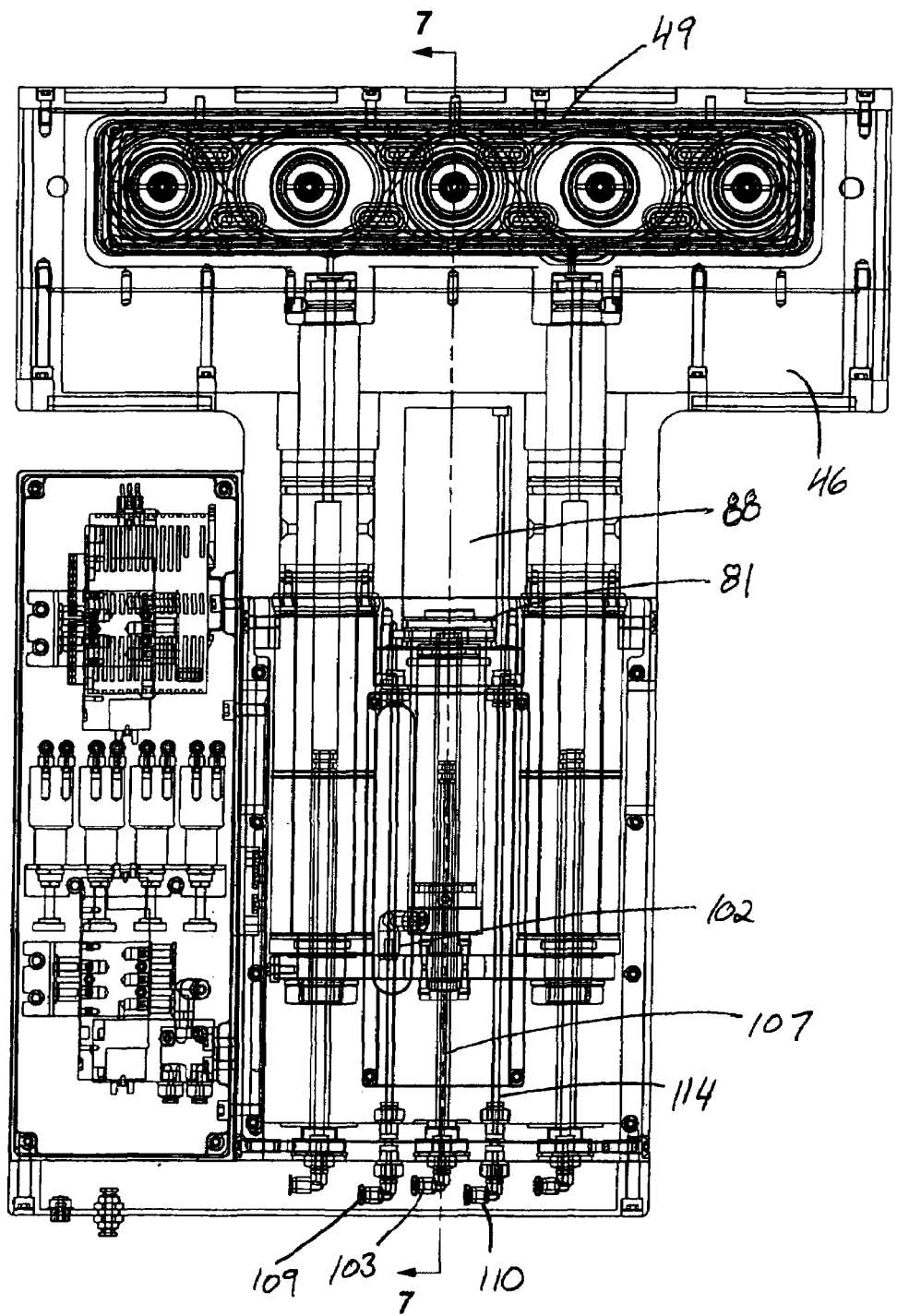
FIG. 6 is a front schematic view of the gate valve of FIG. 1, the gate support shown in a closed position.
Figure 8:
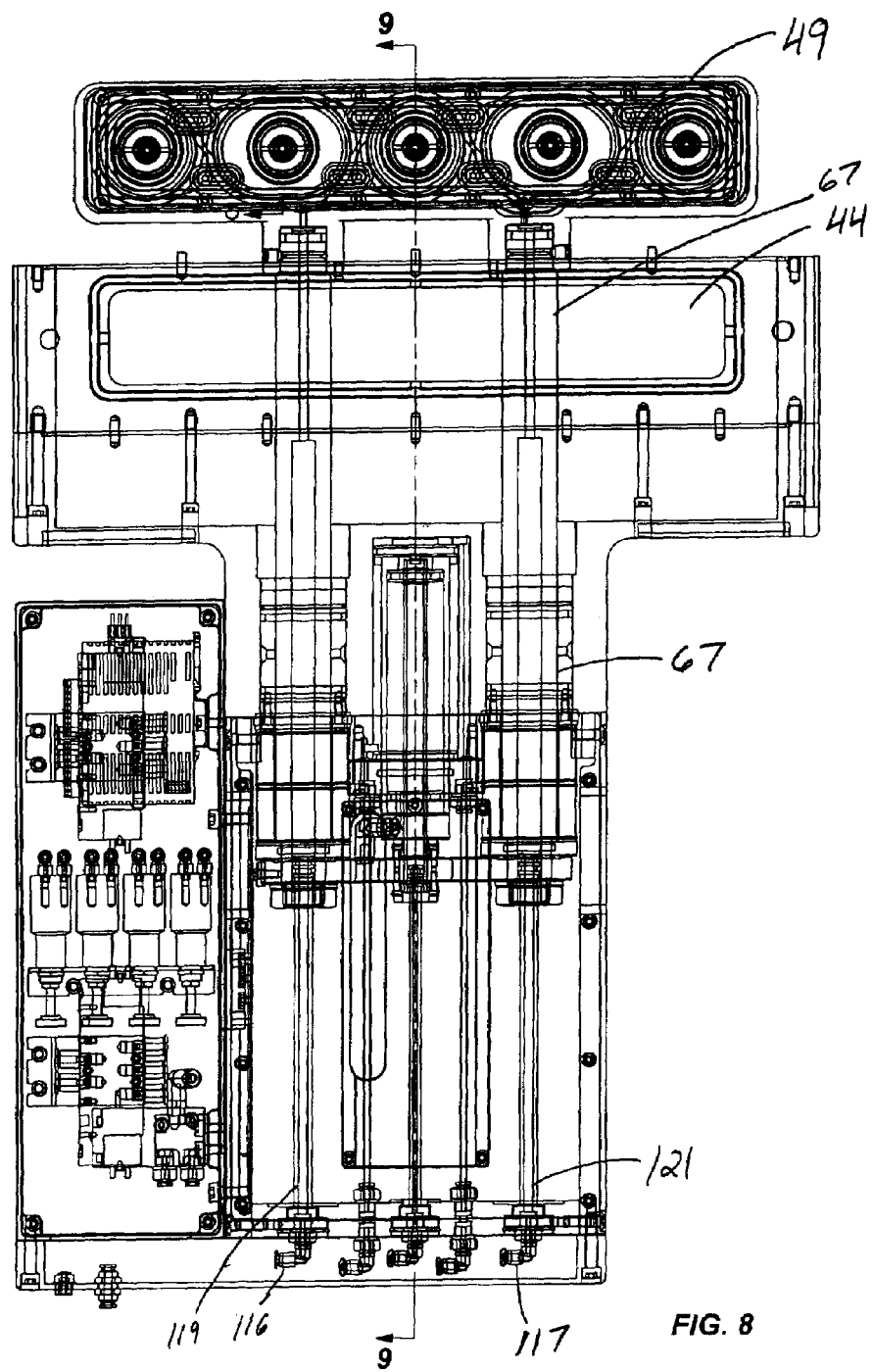
FIG. 8 is a front schematic view of the gate valve of FIG. 1, the gate support shown in an service position.

A top cover portion 42 fits over the open top of the housing. As shown in FIG. 5, the top cover encloses an otherwise open upper end of the housing. The top cover is attached by screws, quick-release clips, or other fasteners. In the illustrated embodiment, the top cover includes a groove and sealing ring to ensure a tight seal over the top of housing 32. Top cover 42 optionally includes recesses or flanges that enable securing of gate valve 30 in position between process modules.

In one embodiment, control module 33 attaches to a portion of the housing to form a single unit, but the module may also be applied out-of-line as a separate unit. The control module includes the control logic and actuator controls for the gate valve. The design and operation of control module 33 should be understood by those in the art and thus are not discussed in detail herein.

The valve housing 32 defines a central opening 44 in a top portion of the gate valve. The top portion of the housing further defines a valve chamber 46 within its interior. When in place in the processing line, handling equipment transfer wafers or the like through opening 44 between processing modules. The opening also defines a flow path through which gases move as the chambers are evacuated.

A valve assembly 47 including a gate support 49 carrying a valve or valve gate 51 is housed within valve chamber 46 at an upper end of housing 32. One will appreciate that one, two, or more gate supports may be used depending upon the selected valve chamber and valve configuration. FIG. 1 illustrates gate valve 30 in an open position defined by the gate support within the housing and below the flow path. FIG. 2 illustrates the gate valve in a closed position defined by the gate valve obstructing or blocking the flow path through opening 44.

Top cover 42 provides access to the valve assembly inside the housing. The top-loading configuration allows the valve to be removed as a single unit. The housing may be assembled in alternative configurations including, but not limited to, a "clam-shell" design or monolithically-formed sleeve. Regardless of the assembly of housing 32, the top portion of the housing allows easy access to the gate support for routine service.

In a service position illustrated in FIG. 3, the gate valve is shown with top cover 42 removed to allow access to the internal gate valve components. The service position is defined by extension of the gate support to a third position beyond a plane formed by the top of the housing. In this position, many of the gate valve components can be accessed without further disassembly.

Fittings, generally designated 53, extend through apertures in the bottom of valve housing 32. The fittings connect the internal valve mechanisms to control module 33. A bottom cover 54 fits over tubing connected to the fittings to prevent contaminants from entering the gate valve interior and to protect the fittings, tubing, and the like.

Turning now to FIGS. 4-9, gate support 49 reciprocates longitudinally within valve chamber 46. The gate support includes valve 51 provided with an annular sealing groove 56 which receives a valve ring, gate bellows 58, internal valve actuators (not shown), gate piston 60, valve piston cover 61, and valve support plate 63. Valve 51 is configured as a gate extending in a lateral direction and configured to seal against opening 44 in the housing in a transverse direction. The valve is secured to the gate support with a piston-and-rod configuration or other known methods. The components included in the gate support and their use are known in the art and will not be described in detail herein. Alternative configurations for the gate support are envisioned and depend upon the particular configuration of the gate valve.

In the closed position illustrated in FIGS. 2 and 7, actuators force valve 51 to reciprocate transversely and seal against opening 44 in the housing, thereby closing the gate valve. In an open position illustrated in FIGS. 1 and 5, the valve retracts to prevent contact with the interior of housing 32. A strongback 65 optionally supports the valve to prevent contact between the valve and internal surfaces during actuation of the valve.

Gate support 49 is carried on reciprocable outer drive shafts 67. The drive shafts support the gate support in the valve housing as it reciprocates. In the illustrated embodiment, the drive shafts are at least partially hollow to accommodate conduits 68 and drive guides 70 longitudinally along their length. In the illustrated embodiment, the drive shafts are cylinders concentric with the guides.

The top ends of the drive shafts includes stubs 72 configured for insertion into counterpart collars 74 in the gate support. The gate support fastens to the drive shaft stubs with set screws or other known fasteners. Other methods in the art for fastening the drive shafts to the gate support are envisioned.

In the illustrated embodiment, the drive shafts or other members supporting gate support 49 are preferably rigid enough to minimize internal contact when drive shafts 67 and valve 51 reciprocate. The drive shafts reciprocate along guides 70, which run from a lower end of housing 32 to valve chamber 46 (best seen in FIG. 1). In this manner, the drive guides serve to guide the drive shafts as they reciprocate. However, other configurations are envisioned. For example, the conduits may be non-rigid and guide surfaces may be provided internally to the housing.

As shown in FIG. 1, drive shafts 67 are operably connected to each other and a centrally-located dual actuator assembly 75 by a driving bar 77. The drive bar fastens to the bottom of each drive shaft by means of a nut, clip, or other fastening method. The illustrated drive bar includes five apertures, generally designated 79. A central aperture accommodates a guide rod for the inner actuator assembly. The two outer apertures accommodate guides 70. The remaining two apertures accommodate conduits or controls. One in the art will appreciate that other routing configurations may be used for internal conduits, working components, and the like.

Continuing with FIGS. 4-9, dual actuator assembly 75 includes a centrally-positioned service piston assembly 81 and an inner piston assembly 82. The service piston assembly includes a service piston 84 having a service piston body 86 radially extending outward from the service piston chamber.

In one embodiment, the service piston assembly and inner piston assembly are double-acting piston assemblies that move in a longitudinal direction. The service chamber is formed within housing 32 and is centrally-located between drive shafts 67.

The service piston body reciprocates in service chamber 88. The service piston further includes a piston rod portion 89, piston or plug portion 91, and piston head 93. Likewise, the inner piston has a rod portion 95, piston portion 96, and piston head 98. The piston plug portions of the inner piston and service piston include annular grooves that receive sealing rings. As known in the art, the piston plug seals to the inner wall of the inner piston to prevent the flow of gas or fluid longitudinally across the plug.

In the illustrated embodiment, the service piston body and inner piston are cylindrical and concentric. The service piston body thereby forms an inner piston chamber in which an upper end of the inner piston reciprocates. The inner piston reciprocates along an inner piston guide rod 100 running along the axis of both the inner and service pistons. One skilled in the art, however, will appreciate that the service piston body and inner piston plug may have alternative configurations to operably connect and allow the inner piston plug to reciprocate within the service piston body.

Driving bar 77 laterally extends from the lower end of inner piston assembly 82 to drive shafts 67. The driving bar is affixed to the inner piston 82 and drive shafts 67 such that the driving bar and drive shafts operably connect the inner piston assembly to gate support 49. The inner piston may be operably connected to the gate support in other manners known in the mechanical, electrical, and other arts. Additionally, the quantity and shape of the drive shafts or like elements used to drive the gate support may vary.

The service piston assembly and inner piston assembly are driven by a plurality of actuators. In the illustrated embodiment, the actuators move the piston assembly by application of pressure through inlet ports and vent ports. Actuation mechanisms include, but are not limited to, pneumatics, solenoids, and motors.

Figure 14:
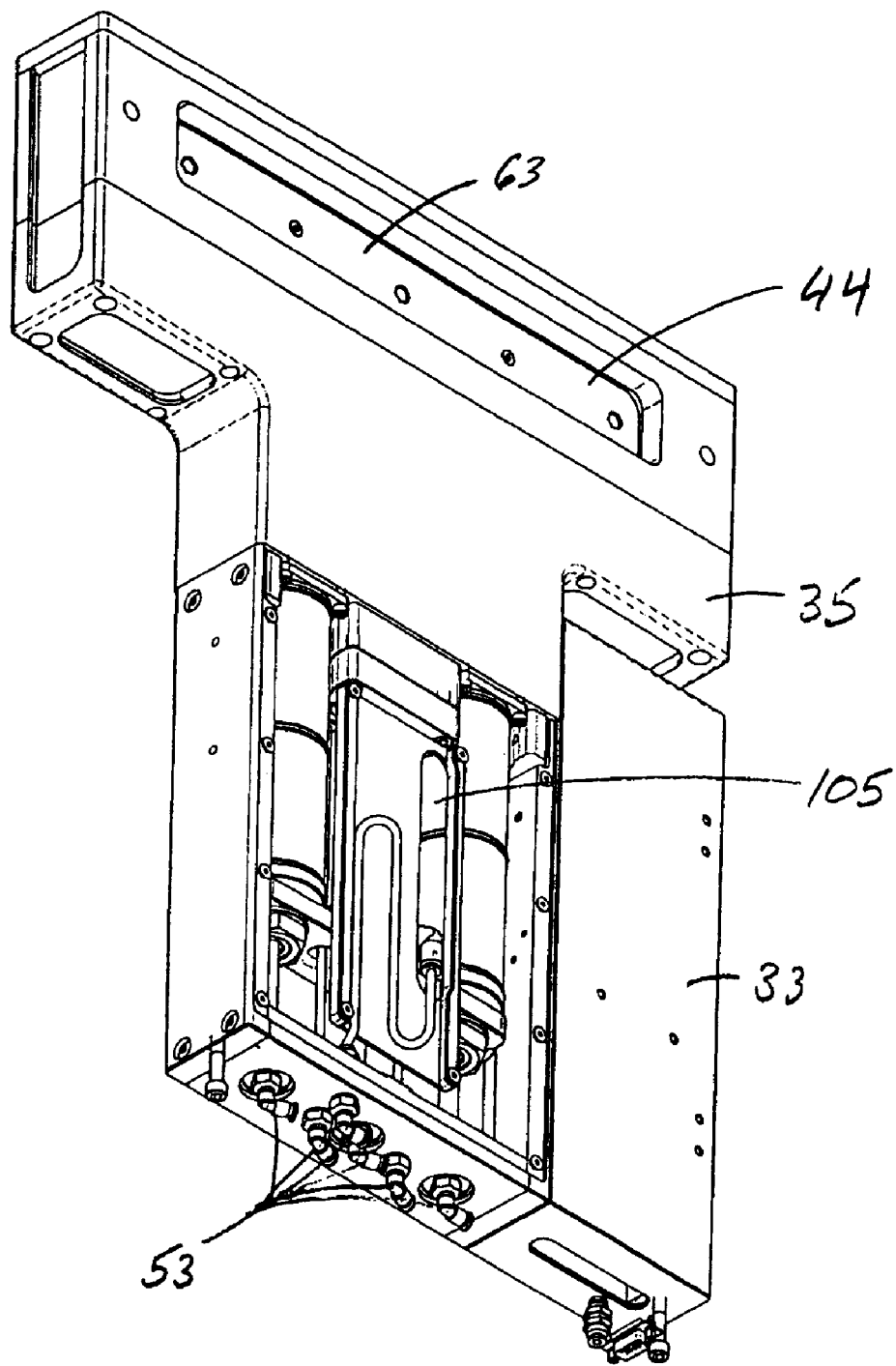
FIG. 14 is a rear schematic view of the gate valve of FIG. 1, the gate valve shown with the rear side of the housing removed.

A first actuator connects to fittings 102, 103. Fitting 102, affixed to a lower end of service piston assembly 81, connects to an extendable air line protruding through a slot 105 in a rear portion of housing 32 (shown in FIG. 14). Centrally-located fitting 103 connects to conduit 107, which runs partially through the inside of inner piston 82.

A second actuator connects to fittings 109, 110 laterally offset from central fitting 103. Fitting 109 connects to conduit 112 running along the left side of dual actuator 75. Conduit 112 supplies gas pressure to a region between an underside of service piston plug 91 and a top end of inner piston plug 96. Fitting 110 attaches to a conduit 114 running along the right side of the service piston assembly to a gas inlet to service chamber 88 above the service piston.

A third actuator connects to valve 51 through fittings 116, 117 and conduits 119, 121 running through drive shafts 67. The third actuator controls the valve carried on the drive shafts. A gate piston 60 situated on the gate support is configured to move valve 51. In the illustrated embodiment, the third actuator is pneumatic and the drive shafts house extendable air lines to operably connect the third actuator to gate piston 60; however, other configurations are envisioned including, but not limited to, a single or multiple air lines.

Gate valve 30 includes multiple seals and bellows 123 to maintain gas pressure in service piston assembly 81 and like components. The bellows further isolate the working components to prevent contaminants from entering the process modules. The use of seals and bellows are known in the art and will not be described in detail herein.

Turning now to operation and use, gate valve 30 illustrated in FIGS. 1-3 is a dual-action valve that reciprocates between open and service positions in response to pneumatic pressure applied to fittings 53. The gate valve is situated between process modules in a cluster assembly. During general operation, control module 33 selects pressure to be directed to the first and third actuators to open and close the gate valve, thereby sealing and opening the process modules.

Focusing on FIGS. 10-11, the second actuator applies pressure to bias service piston 84 in an operating position at a lower end of the service chamber. The operating position is defined by the service piston being at a lower end of the service chamber in response to a downward biasing force. The first actuator applies pressure to piston plug 96 of inner piston 82 such that the inner piston assembly reciprocates in inner service chamber 84 between open and closed positions.

Service piston 84 remains at a lower position during normal operation of the gate valve. The lower set position of the service chamber defines an operating position. The biasing pressure applied by the second actuator retains the service piston in this lowered, operating position even when the inner piston abuts the underside of service piston plug end 91 in a gate-closed position. As known in the art, release latches and other configurations may be used to maintain the service piston in position during operation.

In the operating position, the service piston assembly is adjacent to a bottom end of the service chamber. In the illustrated embodiment, the piston bottoms out on the lower end of the chamber. In another embodiment, the gate valve optionally includes a piston stop in the piston chamber to limit downward movement and set the lower operating position of the service piston. One will appreciate that other alternatives may be utilized depending on the configuration.

As the inner piston reciprocates during normal operation, driving bar 77 moves up and down but fittings 53 generally remain in a fixed position relative to the service piston assembly. Similarly, fitting 102 connected to the first actuator does not move with the inner piston.

With the service piston in an operating position, inner piston plug 96 moves within the inner piston chamber formed by service piston 84. As described above, the inner piston is operably connected to drive shafts 67, and ultimately gate support 49, by driving bar 77. As the inner piston assembly moves down, gate support 49 moves from a closed position in opening 44 to an open position. As the inner piston assembly moves upward, the gate support moves back to the closed position.

In operation, the valve moves in conjunction with the gate support. As the inner piston moves between open and closed positions, the third actuator activates gate piston 60 thus driving valve 51. As known in the art, the internal valve actuators drive the valve transversely against the housing and seal the valve in the closed position.

As shown in FIGS. 4-7, the valve is in a retracted position when the gate support moves to avoid contact with an inner surface of housing 32. In the closed position, the gate piston seals the valve against the opening in the housing. Moving back to an open position, the gate piston retracts the valve. Thus, the valve is only extended when the gate support is in a closed position.

The control module is programmed so that valve 51 reciprocates transversely between sealed and retracted positions in conjunction with longitudinal movement of gate support 49. As known in the art, other configurations, such as a cam mechanism, may be employed to actuate the gate piston in cooperation with movement of the gate support.

A safety release valve (not shown) may optionally be provided from the dual actuator assembly to the outside of the housing to prevent damage during opening and closing of the gate valve. If an object interferes with the movement of gate support 49 into a closed position, pressure will build up in the inner piston chamber and resist movement of inner piston 82. The safety release valve acts to relieve excess pressure in the chamber thereby preventing damage to the gate valve and objects in opening 44. Similarly, a safety release valve may be affixed to the service chamber 88.

Gate valve 30 periodically requires service of components in and around the gate support. For example, the "O-rings" sealing the drive shafts to the gate support periodically require replacement. In order to service the gate valve, the gate support moves from an open position to a closed position then to a service position at least partially outside of housing 32. This third, service position allows easy access to internal components.

In order to move from a closed to a service position, the first actuator applies pressure to push the inner piston upward. The second actuator then applies pressure to service piston plug 91 through conduit 112 to force the whole dual actuator assembly 75 upward. In one embodiment, the pressure above the service piston assembly is allowed to vent through conduit 114, thereby releasing the bias pressure on the service piston assembly. The entire dual actuator assembly 75 is thus forced upward to a third position at an upper end of the service piston chamber remote from the open position (shown in FIGS. 8 and 12).

Focusing on the service position depicted in FIG. 12, the plug ends of the service piston and inner piston are both in an upper region of service chamber 88. The inner piston abuts the underside of the service piston head. Fitting 102 attached to the service piston is likewise in an upper position. With the inner piston in a service position, the driving bar connected to the inner piston and drive shafts is also in a third, service position above the operating position shown in FIG. 13. The gate support is thus driven beyond the closed position in the housing to a position accessible by a user. The entire gate support and valve are thus accessible in the service position.

In the illustrated embodiment, sufficient upward pressure applied to service piston assembly 81 drives the whole assembly 75 upward. The pressure must be sufficient to surpass a threshold pressure defined by sufficient pressure to drive dual actuator assembly 75 upwards. In the illustrated embodiment, this is achieved when upward pressure on the actuator assembly exceeds or overcomes the downward bias pressure on service piston 84. In another embodiment, conduit 114 allows the biasing pressure on the service piston plug to exhaust from above the service piston 84 in the chamber 88 such that there is no pressure differential and actuator assembly 75 moves upward.

In yet another embodiment, the piston head 98 of the inner piston is configured to abut the bottom of piston plug 91 of the service piston. The inner piston is driven upwards to a closed position. Pressure is then increased above the threshold pressure to force the inner piston to create a service pressure differential. At this point when the pressure applied to the inner piston is sufficient to overcome the bias pressure, the inner piston will push further upwards on the service piston such that the entire dual actuator assembly moves upwards to a service position. Thus, the service piston is reached by applying pressure only to the inner piston. One skilled in the art, however, will appreciate that other configurations may be used.

The general method of using gate valve 30 in a cluster assembly in accordance with the present invention will now be described. During normal operation, control module 33 directs the second actuator to maintain the service piston in the operating position. The gate support lies in an open position to allow an incoming unit to be transferred through opening 44. The control module then actuates the first actuator to move the gate support from the open position out of the flow path to the closed position in the flow path. The third actuator then activates the gate piston to seal the valve, thereby sealing the opening. After the processing is completed in the module, the first and third actuators are activated to move the gate support back from the closed to open position and the process is repeated.

When the gate valve needs servicing, a user removes top cover 42 to expose a top end of the housing and gate support. The user then selects a service position. The control module moves the gate support to a closed position if the gate valve is not already closed. Next, as described above, the control module directs a second actuator to extend the gate support from the closed position to the service position substantially outside the valve housing.

In this service position, a user can access valve 51 and support 49 for service by merely removing top cover 42 and selecting a service position via the control module. In this manner, the gate support is accessible without removing the gate valve from the processing line or disassembling the housing. It has been found, for example, that the gate valve of the present invention decreases the time to service the gate support sealing rings from ten hours to ten minutes.

For convenience in explanation and accurate definition in the appended claims, the terms "up" or "upper", "down" or "lower", "inside" and "outside" are used to describe features of the present invention with reference to the positions of such features as displayed in the figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A gate valve comprising:
   a valve housing defining a valve chamber having an opening therethrough along a flow path;
   a gate support supported within the valve housing between a closed position in the flow path, an open position outside of the flow path, and a service position extending out of the valve housing; and
   a dual actuator assembly having a service piston assembly having a service piston reciprocable within the valve housing, and an inner piston assembly having an inner piston reciprocable within the service piston assembly, wherein the gate support is configured to reciprocate with the inner piston between the closed and open positions, and with the service piston between the closed and the service positions.

2. A gate valve according to claim 1, wherein the service piston assembly is a double-acting piston assembly.

3. A gate valve according to claim 1, wherein the inner piston assembly is a double-acting piston assembly.

4. A gate valve according to claim 2, wherein the service piston assembly includes a service piston chamber formed in the valve housing having upper and lower ends, wherein the service piston is adjacent to the upper end of the service chamber when the gate support is in the service position, and the service piston is adjacent to the lower end of the gate support during normal operation between the closed and open positions.

5. A gate valve according to claim 4, wherein the service piston abuts the upper end of the service chamber when the gate support is in the service position, and the service piston abuts the lower end of the service chamber during normal operation.

6. A gate valve according to claim 4, wherein the service piston assembly includes a service piston body, wherein the service piston body is hollow and forms an inner piston chamber in which the inner piston reciprocates.

7. A gate valve according to claim 6, wherein the inner piston abuts against an upper end of the inner piston chamber when the gate support is in the closed position.

8. A gate valve according to claim 1, wherein the inner piston assembly is concentric with the service piston assembly.

9. A gate valve according to claim 1, wherein the inner piston reciprocates independently relative to the service piston during operation of the gate valve.

10. A gate valve according to claim 1, further comprising:
    a first actuator controlling the inner piston assembly to move the gate support between the closed and open positions;
    a second actuator controlling the service piston assembly to move the gate support between the closed and service positions;
    a transversely reciprocable valve gate carried on the gate support between an sealed position abutting against the opening and a retracted position; and a third actuator controlling the valve gate between the sealed and retracted positions.

11. A gate valve according to claim 10, wherein the first actuator biases the inner piston against the upper end of the inner piston chamber as the second actuator moves the service piston and the gate support between the closed and service positions.

12. A gate valve according to claim 10, wherein the second actuator biases the service piston against a lower end of the service piston chamber as the first actuator moves the inner piston and the gate support between the closed and open positions.

13. A gate valve according to claim 12, the gate valve further including a piston stop in a lower end of the housing configured to limit the downward movement of the service piston.

14. A gate valve according to claim 1, wherein the inner piston and the service piston are cylindrical.

15. A gate valve according to claim 6, wherein the service piston body includes an inner piston chamber plug and a fitting on the inner piston chamber plug, the fitting being configured to move with the service piston body.

16. A gate valve according to claim 1, a driving bar is affixed to a lower end of the inner piston rod, and a drive shaft interconnects the driving bar to the gate support, wherein the driving bar and the drive shaft operably connects the inner piston assembly to the gate support.

17. A gate valve according to claim 16, wherein the driving bar laterally extends from the lower end of the inner piston rod to the drive shaft.

18. A gate valve according to claim 10, wherein the third actuator is pneumatic, the gate valve further comprising a gate piston on the gate support for moving the valve gate, and an extendable air line housed within the driving shaft operably connecting the third actuator to the gate piston.

19. A gate valve according to claim 10, wherein the first actuator is pneumatic, the gate valve further comprising an extendable air line within the inner piston rod operably connecting the first actuator to the inner piston chamber.

* * * * *